United States Patent
Fredrickson et al.

(10) Patent No.: US 6,195,028 B1
(45) Date of Patent: Feb. 27, 2001

(54) AMPLIFIER GAIN CONTROL METHOD USING CONDITIONAL UPDATING

(75) Inventors: Lisa Fredrickson, Ojai; Dennis C. Stone, Glendale; LeRoy Volz, Northridge, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/281,606

(22) Filed: Mar. 30, 1999

Related U.S. Application Data (62) Division of application No. 08/954,167, filed on Oct. 20, 1997.

(51) Int. Cl.$^7$ .................................................. H03M 1/00
(52) U.S. Cl. ............................ 341/132; 367/59; 330/129
(58) Field of Search ................................ 341/132, 122, 341/123, 155, 118; 330/129; 369/43, 44.36, 44.34

(56) References Cited

U.S. PATENT DOCUMENTS

| | | | |
|---|---|---|---|
| 3,969,683 | * | 7/1976 | Fabricius ............................ 330/129 |
| 4,066,977 | * | 1/1978 | Chambers et al. .................. 330/129 |
| 5,050,016 | * | 9/1991 | Squires ............................. 370/77.08 |
| 5,121,262 | * | 6/1992 | Squires et al. ........................ 360/46 |
| 5,600,615 | * | 2/1997 | Kiyoura et al. .................. 369/44.35 |
| 5,638,403 | * | 6/1997 | Birchler et al. ...................... 375/296 |
| 5,668,678 | | 9/1997 | Reed et al. ............................. 360/51 |
| 5,680,075 | * | 10/1997 | Sacca .................................. 330/279 |

* cited by examiner

Primary Examiner—Peguy JeanPierre
(74) Attorney, Agent, or Firm—Jonathan E. Olson; Shawn B. Dempster; Edward P. Heller, III (57) ABSTRACT

In a peak detection system having a variable gain amplifier (VGA), a counter is initialized and a countdown is triggered. Each time a qualified peak is detected, the counter is re-initialized. If the countdown is completed, the VGA gain is updated. This method can be used to boost amplifier gain that is too low to generate a qualifying threshold, even while overlooking short periods of very low output.

8 Claims, 3 Drawing Sheets

AMPLIFIER GAIN CONTROL METHOD USING CONDITIONAL UPDATING

This is a division of application Ser. No. 08/954,167 filed Oct. 20, 1997.

FIELD OF THE INVENTION

The present invention relates to peak detection, and more specifically to a method of digital peak detection of disk drive servo signals.

BACKGROUND OF THE INVENTION

In disk based magnetic recording systems, data are typically stored in circular tracks. The recorded information of the disk surface is divided into sectors. A servo signal is provided on the disk to direct the actuator motor to find and then follow a track. Disk drives commonly use embedded servo information, wherein a small part of the disk surface is allocated to servo fields. The servo fields are encoded to indicate to the servo control system the position of the read/write head on the disk. The servo fields store information about the sector number, the track number, and how to center the head on a track. The track number is encoded using grey codes. The servo information is recorded onto the disk after the Head Disk Assembly (HDA) has been assembled.

Information is stored on the disk in the form of magnetic transitions. Each bit of information stored on the disk corresponds to one magnetic transition. A read head generates electrical signals corresponding to the magnetic transitions. A "1" may be used to designate the presence of a magnetic transition, and a "0" to designate the lack of a magnetic transition. The read head generates either a positive or negative pulse for each magnetic transition depending on the polarity of the transition. Data are read from the disk by processing transition responses.

A peak detector circuit attached to the read head analyzes the analog signal generated by the read head to identify the presence of pulses which indicate magnetic transitions. One conventional analog peak detection method is to differentiate the signal and detect zero crossings of the signal derivative. The signal derivative is zero for local minimums and local maximums. The amplitude of the signal where the derivative is zero is then compared to a threshold level to identify peak samples. Such peak detection methods typically have a sample comparison window two to three samples wide.

A conventional digital peak detection method is to convert the analog samples to digital samples, and then compare a sample to the previous sample and subsequent sample. If the sample is greater than the previous and subsequent sample then the sample is compared with a threshold level. If the sample exceeds the threshold then the sample is identified as a peak. Similar to the conventional analog peak detection system such digital methods typically have a peak comparison window that is three samples wide. One problem with such detection methods is that noise spikes can cause two or more peaks to be reported within a timing window in which there is only one recorded peak. Such false peaks reduce operating efficiency where they are detected and trigger a second reading of the data. When such errors go undetected they can cause system failures.

Peak detectors typically use a variable gain amplifier ("VGA") to amplify the read signal so that the pulses approximate a desired amplitude to optimize pulse detection. Conventional analog peak detectors use the charge on a capacitor to control the VGA gain. One capacitor is used for reading servo signals in servo mode and one capacitor is used for reading data signals in data mode. The capacitors are coupled to the VGA control terminal using a multiplexer to switch between the two capacitors. An automatic gain control (AGC) feedback loop is used to control the VGA gain. When a pulse is detected above the AGC target amplitude, a small amount of charge is discharged from the gain control capacitor to reduce the VGA gain. A resistor coupled to the gain control capacitor is used to charge the capacitor. When a series of pulses are below a minimum qualified pulse amplitude the resistor charges the capacitor which increases the VGA gain and thereby increases the pulse amplitude. One problem with these conventional analog peak detectors is that if the read head goes through a damaged data field where none of the pulses exceed the qualified pulse amplitude level then at the end of the data field the gain is generally increased to a higher level then is desired for the subsequent intact data field. This causes delays while the AGC loop recovers.

At the end of a servo field the servo gain control capacitor stores the gain value for the next servo field. Similarly the data gain control capacitor stores the gain for the next data field. During these storage periods the value of the stored gain deteriorates due to leakage of the capacitor.

Thus there is a need for an improved peak detection system that provides enhanced performance and overcomes these and other problems of the prior art.

SUMMARY OF THE INVENTION

The present invention provides a digital peak detection system. The system first converts an analog signal into digital samples. The digital samples are then converted into absolute values. The absolute values are provided to a delay line consisting of a series of one cycle delays. In one embodiment a sequence of comparators are provided, each of which receives one input from a subsequent stage of the delay line. The other input of all of the comparator stages are coupled together to the input of the delay line. With this configuration each new digital sample is compared to the preceding N samples in parallel, where N is the number of active comparator stages. The comparator stages can be activated using control signals to determine the length of the sample comparison window. To provide robust peak detection a comparison window that is larger than the number of samples between recorded peaks can be used. The outputs of the comparator stages are ANDed together so that the AND gate outputs a high signal when the current sample is greater than all of the preceding samples that it is compared against. Here, a sample whose absolute value is larger than that of the N previous samples is referred to as a current preliminary peak sample.

If the absolute value of a current preliminary peak sample is also greater than or equal to those of the succeeding N samples, it is considered a legitimate peak in a window of 2N+1 consecutive samples. This embodiment minimizes the number of comparator stages required by then using the same comparator stages to compare the current preliminary peak sample to each of the subsequent samples in the comparison window. The subsequent samples are compared by monitoring the output of the comparator stages and one active post-comparison stage for each active comparator stage. In this embodiment, only one comparator is used for every two samples in the 2N+1 sample comparison window. The post-comparison stages each comprise an AND gate, a one-cycle delay, and a control circuit to activate the stage.

One input of each of the post-comparison stages is coupled to the AND gate output from the comparator stages. The other input of each of these post-comparison stages is coupled to the preceding post-comparison stage through the delay element. The post-comparison stages thereby check that the current preliminary peak sample is greater than or equal to each of the subsequent samples in the comparison window. If the current peak sample is greater than or equal to the other samples in the comparison window then the sample is a legitimate peak in the window and is next compared with a qualifier threshold. If the sample is greater than the qualifier then it is identified as a qualified peak.

A second component of the digital peak detection system comprises a gain error control circuit with a countdown timer. A variable gain amplifier is used to optimize the peak detection processes. The gain of the variable gain amplifier is updated based on the difference between the actual peak sample amplitudes and the desired peak sample amplitudes. Detecting a qualified peak is one condition that triggers an update of the variable gain amplifier. When the sample amplitudes are too small to meet the qualifier threshold, a countdown timer is used to increase the variable gain amplifier gain after a programmed time has elapsed without detecting a qualified pulse. The variable gain amplifier gain is also updated when the analog to digital converter saturates. Initial gain values can be programmed, and the variable gain amplifier gain is stored at the end of a servo mode for potential future use to minimize gain control loop convergence time. The present invention thereby provides an enhanced performance digital peak detection system.

Other features and advantages of the present invention would become apparent to a person of skill in the art who studies the present invention disclosure. Therefore, a more detailed description of a preferred embodiment of the invention is given with respect to the following drawings.

DETAILED DESCRIPTION OF A PREFERRED EMBODIMENT

The following describes an embodiment of the present invention as applied to a hard disk drive digital servo detection system. It will be apparent to those of ordinary skill in the art that the present invention can also be used in other recording devices including floppy disk drives, optical disk drives, and tape drives.

The present invention provides an improved method and apparatus for detecting pulses. This technology has wide ranging application. In disk drives, the pulse timing is used to detect track numbers, what servo field is on a track, and other servo information. In one disk drive embodiment, the grey code demodulator signal generated by the read head consists of the summation of noise and the response to a number of overlying tracks written by the servo writer at quarter track centers. The servo writer is assumed to have imperfect phase coherence as it writes each of these tracks. The quarter tracks are written with transitions separated by one or more multiples of a track writer clock period T, under the control of a crystal clock reference. A magneto-resistive ("MR") head is used with a read width that is typically 60–90% of the nominal track width, so that the MR head observes the magnetic summation of three to four quarter tracks.

The read signal waveform typically contains several types of distortion. For example, write phase incoherence can cause some pulse broadening. There may also be extensive shouldering of pulse responses, base-line shift, saturation of the MR head low frequency response, and significant MR head response asymmetry in positive and negative pulse amplitudes.

A servo preamble is used at the start of a servo field. The servo preamble consists of a sine wave recorded at the maximum servo frequency. Servo demodulation is initiated by an external servo gate pin. One embodiment provides the demodulator twelve pulse responses to acquire proper gain of the servo field during the sine wave preamble. The demodulator provides output signals to indicate the presence or absence of a pulse for each pulse window. The demodulator also provides output signals that indicate the polarity of each pulse. A servo sync mark separates the servo preamble and the data to be demodulated. Preceding the servo field is a DC erased gap of approximately 1 us.

Digital Qualified Peak Detector

Figure 1:
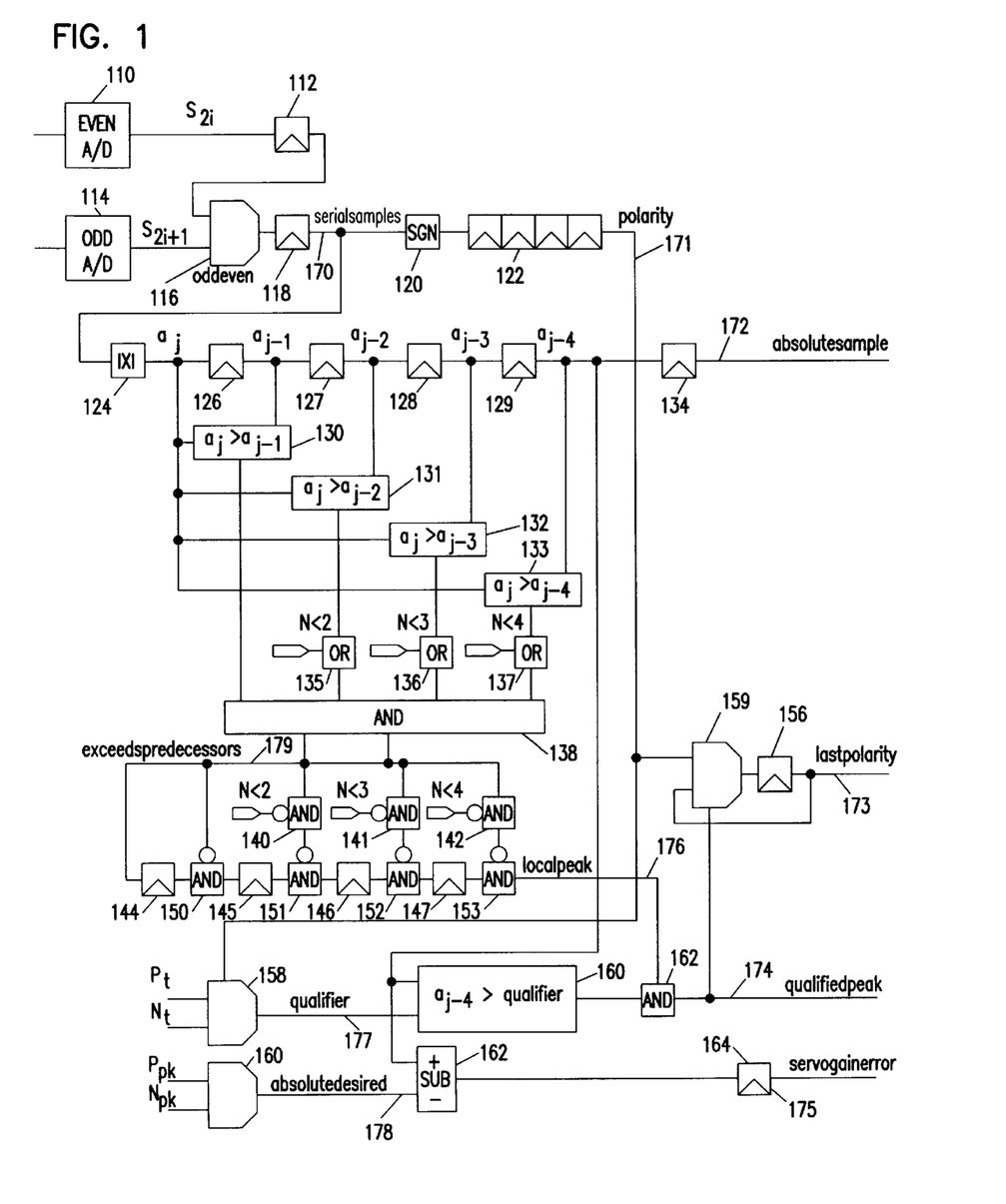
FIG. 1 illustrates a block diagram of a digital qualified peak detector according to one embodiment of the present invention.

FIG. 1 illustrates a block diagram of a digital qualified peak detector with shouldering rejection according to one embodiment of the present invention. The FIG. 1 circuit converts analog signals from the read head into digital signals comprising an encoded series of binary numbers representing the amplitude of the analog signal samples. This conversion is performed by using analog to digital converters 110 and 114. These digital signals are then analyzed to identify local peaks using comparators 130–133 and associated logic. Next the local peaks are compared with qualifier peak threshold levels to identify the qualified peaks using comparator 160.

In operation, the input to analog to digital converters 110 and 114 is the filtered and equalized analog signal produced by the read head as it moves over the magnetic transitions on a disk. The signal comprises a series of typically noisy pulses corresponding to the magnetic transitions. In this embodiment, two analog to digital converters are used to provide high speed conversion of the signal. In an alternative embodiment, only one analog to digital converter is used with a higher clock speed. The digital qualified peak detector of FIG. 1 uses the same analog to digital converters to convert data signals and servo signals. In one FIG. 1 embodiment the clocks for all of the digital components operate at 80 MHz except for the clock for register 112 which operates at 40 MHz. Multiplexer 116 alternates between analog to digital converters 110 and 114. The analog to digital converters 110 and 114 a synchronously sample the pulses using both edges of the 40 MHz reference clock, which corresponds to sampling at approximately 12.5 ns intervals with an imperfect duty cycle. Writing and reading can be performed using crystal controlled clocks so that the frequency offset between writing and reading clocks can be ignored. In one embodiment, each pulse period is sampled approximately eight times using eight clock periods per pulse.

After multiplexer 116, the digital signal is split into a sign bit signal generated by element 120 and an absolute value of the signal amplitude generated by absolute value conversion circuit 124. The absolute values are provided to the block of comparators 130–133. Each sample is both compared to the previous samples and propagated through the delay registers 126–129. For example, comparator 130 compares the absolute value of the current sample point $a_j$ with that of the previous sample point $a_{j-1}$.

The current sample is compared to samples in a moving window, where circuit controls define the width of the comparison window. Let $s_i$ denote the $i^{th}$ sample. A local peak comparison window length, N, is set by a control register so that a local peak is defined as a sample whose amplitude is the largest sample over a range of N samples before or after that sample. In other words, $s_i$ is a local peak if the following equations are satisfied:

$$|s_i| > |s_{i-j}| \text{ for } j = 1, \ldots, N$$

$$|s_i| \geq |s_{i+j}| \text{ for } j = 1, \ldots, N$$

The number of preceding samples that a current sample is compared to is controlled by the control signals N<2, N<3 and N<4 coupled to OR gates 135–137. When an OR gate control line is low the corresponding comparator is an active comparator, meaning that it is included in the local peak identification process. For example, when the N<4 control line is low, it indicates that N is greater than 3, and the output of the $a_j > a_{j-4}$ comparator 133 must be high for AND gate 138 to provide a high output signal indicating that aj exceeds this predecessor absolute value within the comparison window. When the current sample is greater than all the preceding samples in the comparison window, then comparator 130 and OR gates 135, 136, and 137 all output a high logic level signal to AND gate 138. Such a sample is referred to as a preliminary current peak sample.

The logic block following AND gate 138 determines whether a sample identified as being greater than the preceding samples in the comparison window, is greater than or equal to the subsequent number of samples within the comparison window. The number of subsequent samples to compare a sample to is defined using the N<2, N<3 and N<4 control lines coupled to AND gates 140–142. Each control line is inverted at the input to one of these AND gates. The control lines are defined so that the number of active stages corresponds to the number of subsequent samples that a peak is compared to. For example, to include the comparison of a sample to the second subsequent sample the N<2 control line is set to a logic low value. For example, when a current peak causes the output of AND gate 138 to switch high, this high level sample is stored in register 144. At the next clock cycle, comparator $a_j > a_{j-1}$ 130 compares the current peak sample with the subsequent sample. If the subsequent sample $a_j$ is less than or equal to the current peak sample $a_{j-1}$, then comparator $a_j > a_{j-1}$ 130 outputs a low level signal. This low level signal causes AND gate 138 to output a low level signal. The AND gate 138 output is then inverted at the inverted input of AND gate 150, thereby providing a high level input signal. This high level input, combined with the high level input from delay register 144 causes AND gate 150 to provide a high output level signal. This process is repeated for the second subsequent sample at the next clock cycle, and again for the third and fourth subsequent samples. If none of the subsequent samples in the comparison window are greater than the current peak sample, then the high pulse from AND gate 138 corresponding to the current peak sample passes through AND gates 150–153 over the next four clock cycles to assert the localpeak 176 signal.

If one or more of the subsequent samples that is in the comparison window is greater than the preliminary current peak sample then the first of these samples causes AND gate 138 to switch high. This is because the current peak sample is by definition higher than the preceding samples in the comparison window. Hence, if a new sample is greater than the preliminary current peak sample it will also be greater than the other preceding samples in the comparison window. This causes each of the comparator outputs 130–132 to output a logic high signal. The AND gate 138 output being high causes each of the AND gates 140–142 to produce a high level output. These high level signals are inverted at the inputs to AND gates 150–153, causing AND gates 150–153 to output logic low level signals. This makes the localpeak signal 176 low which keeps the qualified peak signal 174 low. This in turn prevents the preliminary current peak from being identified as a qualified peak. The peak detector of FIG. 1 thereby uses only four comparators and associated logic to identify a peak sample in a comparison window up to nine samples wide.

Optimizing the width of peak comparison windows can provide some immunity to pulse shouldering. Pulse shouldering occurs where misalignment of a pulse causes the pulse to form a double-humped pulse waveform rather than a single distinct pulse. Setting the width of the comparison window to a sample or two larger than the number of samples between recorded peaks prevents falsely identifying a second peak in a single period. For example, for a system where the recorded peaks are eight samples apart, a pulse comparison window of nine samples prevents a second peak from being reported within four samples of an identified peak. Alternatively, for a system where recorded peaks are five samples apart, a pulse comparison window of seven samples could be used by de-activating the appropriate number of comparator stages and subsequent post-comparison stages using the control signals coupled to OR gates 135–137 and AND gates 140–142 respectively. The present invention peak detector thereby analyzes samples over a larger comparison window than conventional peak detectors so as to provide a more robust peak detection system.

After passing through delay registers 126–129 each sample is provided as an input to comparator 160, which determines if the absolute value of $a_{j-4}$ is greater than the qualifier threshold of comparator 160. The second input to comparator 160 is the qualifier signal 177 which is the qualified pulse threshold level. If the amplitude of the sample is greater than the qualifier amplitude then comparator 160 outputs a logic high level signal to AND gate 162. If this sample is also a local peak as described above, then the localpeak 176 signal will be at a logic high level at the second input to AND gate 162. This causes AND gate 162 to output a high level signal on qualifiedpeak signal 174 which signals to the gain update control circuit of FIG. 2 that a qualified peak has been detected. A qualified peak further causes the sign of the peak to be latched for an external peak polarity output, not shown, which is held until the detection of the next qualified peak. The amplitude of the sample is provided to the FIG. 2 gain update control circuit by the absolutesample signal 172 in the form of a binary number. In one embodiment that absolute sample value is saturated at 31.

The inputs to multiplexer 158 provide two pulse qualifier threshold levels. The thresholds are defined so as to prevent low level noise from being mistaken for a pulse. The first input, $P_t$, provides a qualifier threshold for positive pulses. The second input, $N_t$, provides a qualifier threshold for negative pulses. These two different qualifier thresholds are used to account for differences in the amplitudes of positive and negative pulses. For example, magneto-resistive heads commonly used in hard disk drives can produce asymmetrical signals for positive and negative pulses in which either the positive or the negative pulses may have larger amplitudes. The values of the qualifier thresholds are optimized for total system performance. The qualifier thresholds can also be determined as part of the disk drive production process based on a characterization of the specific component performance parameters of each disk drive. An example of a starting qualifier threshold value before adjustment for read channel asymmetry or disk drive characterization is 50% of the desired absolute peak sample value. Polarity signal 171 indicates the polarity of the pulse and determines which polarity qualifier threshold is used.

The inputs to multiplexer 160 provide two absolute desired pulse amplitude levels. $P_{pk}$ is the desired positive mean absolute value of a peak sample, and $N_{PK}$ is the desired negative mean absolute value of a peak sample. In one embodiment each absolute value is a programmable number in the range of $\{0, 2, 4, \ldots, 30\}$. The polarity signal 171 determines which of these values is used for the current sample. The selected desired mean absolute peak sample value is provided to the negative input of subtraction element 162. Subtraction element 162 subtracts the desired mean absolute value peak sample from the absolute sample value. This difference is the servo gain error. The subtraction element 162 output is delayed by one cycle and then signal servogainerror 175 provides this value to the gain update control circuit of FIG. 2. This difference value is further processed, as shown on the succeeding schematics, to generate an estimate of the gain error during servo. The closed servo gain loop attempts to drive the difference between observed peak samples and the desired peak samples to zero as shown in FIG. 3.

Gain Update Control Circuit

Figure 2:
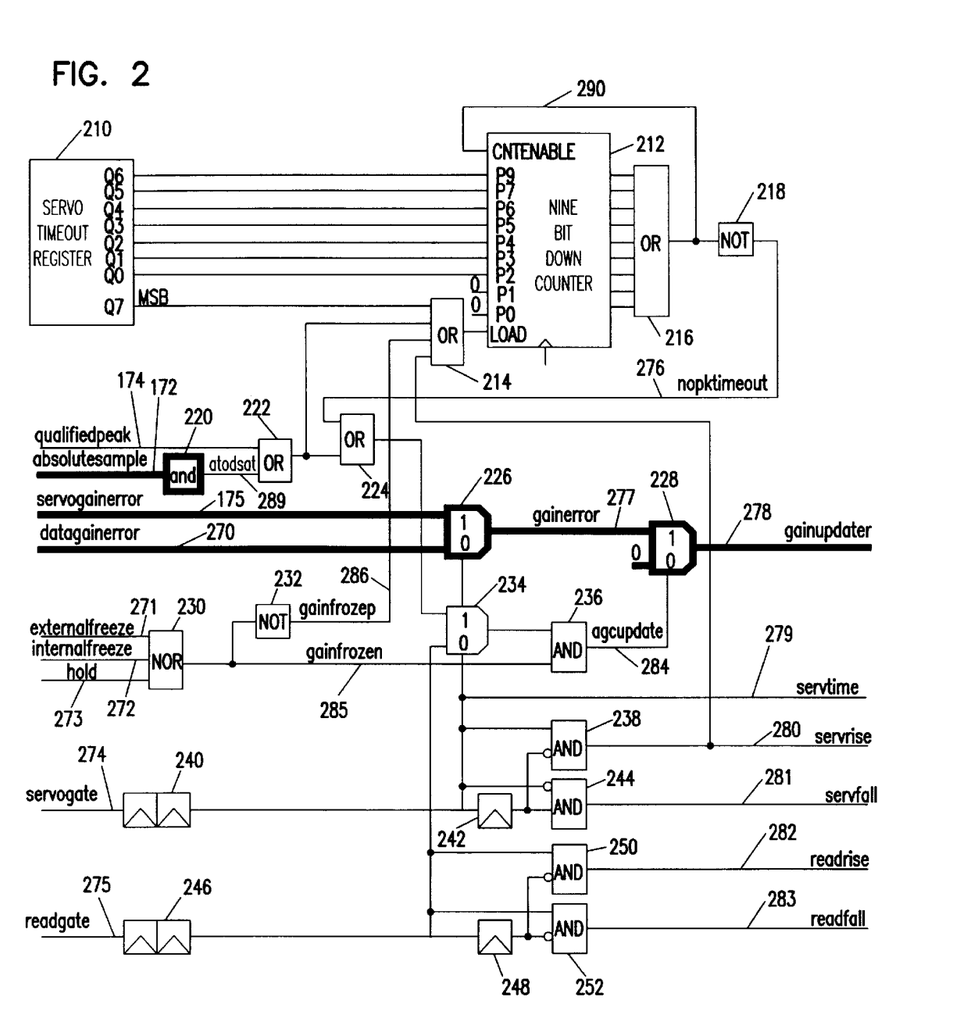
FIG. 2 illustrates a block diagram of a gain error control circuit with a countdown timer according to one embodiment of the present invention.
Figure 3:
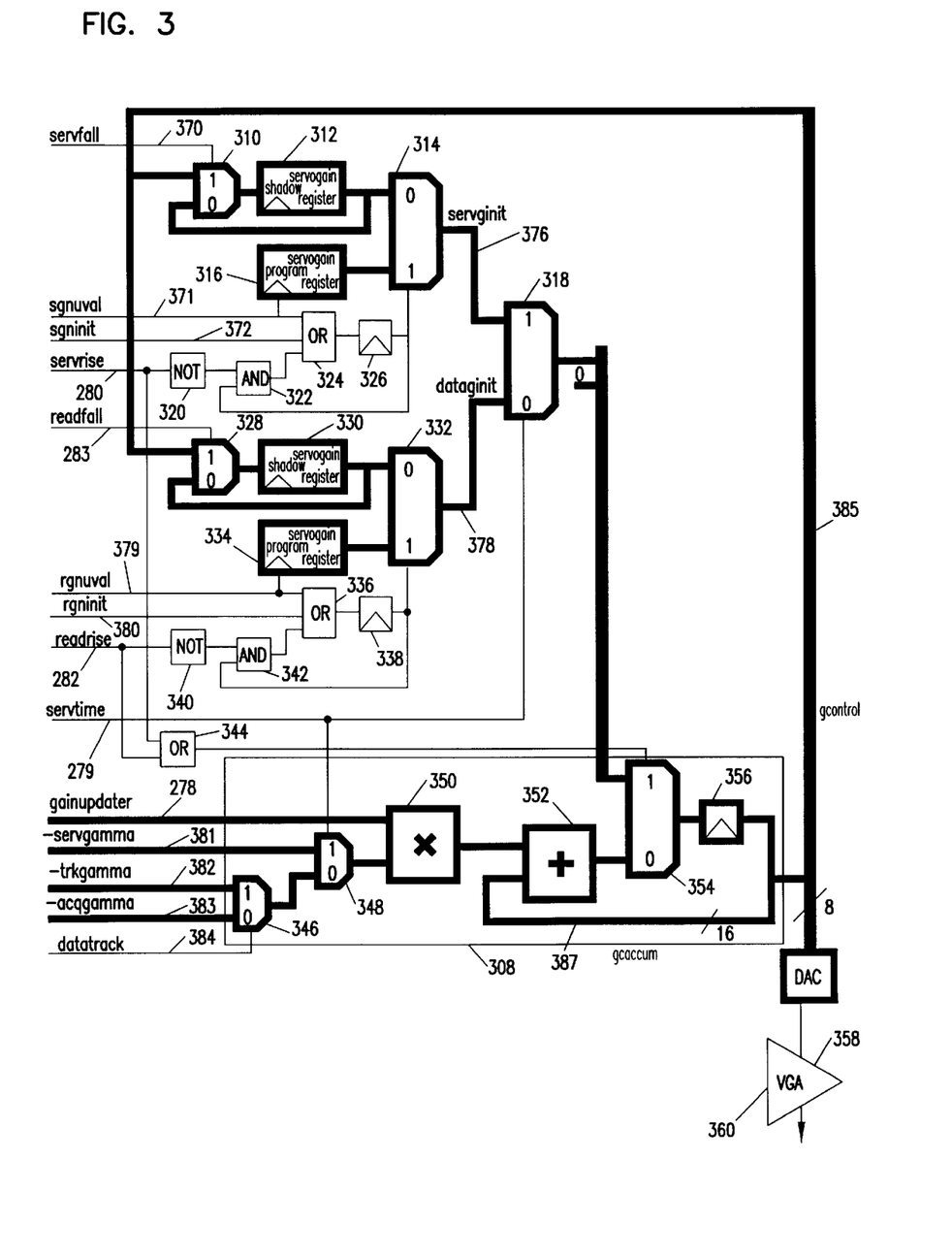
FIG. 3 illustrates a block diagram of a gain update control circuit according to one embodiment of the present invention.

FIG. 2 illustrates a block diagram of a gain update control circuit with a countdown timer according to one embodiment of the present invention. The gain update control circuit routes and enables updates of the gain loop. The gain update control circuit includes a countdown timer 212 with a servo timeout register 210 coupled to the input bits. The gain update control circuit also includes several control signals that determine how the VGA 360 gain is adjusted, illustrated in FIG. 3, and associated control logic circuitry to implement the control functions of these signals. There are two externally generated inputs, external freeze 271 and hold 273, which defeat update of the gain loop, and one internally generated signal, internalfreeze 272, which defeats updates of the gain loop. The servogainerror signal 175, absolutesample signal 172 and qualifiedpeak signal 174 outputs from FIG. 1 are input signals for FIG. 2.

The control signals servogate 274 and readgate 275 determine whether the AGC loop is in data mode or servo mode. When servogate 274 is at a logic high level the gain update control circuit of FIG. 2 is in servo mode and data is not being read. Except where expressly stated otherwise, the operation of the circuit is described in servo mode. After passing through the two delay registers 240, the servogate signal 274 becomes a control signal for multiplexers 234 and 226. With servogate 274 high, input 1 of multiplexer 234 and the servogainerror 175 input of multiplexer 226 are selected. The servogainerror signal 175 is an output from the FIG. 1 digital qualified peak detector. Servogainerror 175 is a binary number representing the difference between the desired and actual pulse amplitude. Servogainerror 175 passes through multiplexer 226 to become the gainerror 277 signal. The gainerror signal 277 is one input to multiplexer 228. Multiplexer 228 has an agcupdate 284 control line. With agcupdate 284 at a logic high level, the gainerror 277 input of multiplexer 228 is selected and the gainerror signal 277 is coupled to the gainupdater 278 output of multiplexer 228. The gainupdater signal 278 is then provided to the gain accumulator and control circuit illustrated in FIG. 3. The gainupdater signal 278 is used to adjust the gain of the VGA 360 to optimize the pulse amplitude. When the agcupdate 284 control line of multiplexer 228 is at a logic low level, the 0 input is selected. The 0 input signal of multiplexer 228 is a binary number comprising all 0's. The gainupdater 278 signal is then 0 and therefore no change is made to the VGA 360 gain. Thus, at any time, gainupdater 278 is either the gainerror 277 or 0.

The no update 0 input of multiplexer 228 is used to stop adjustment of the gain when pulses are being read for which the VGA 360 gain should not be changed. For example in a servo field there may be partial amplitude pulses such as for fine positioning that the VGA 360 should not be adjusted for. Rather there are typically a particular field of pulses in a servo field that the VGA 360 gain should be adjusted to, and then the AGC gain should be frozen at that level. Any of the three gain update disable signals externalfreeze 271, internalfreeze 272, or hold 273 can be used to prevent the VGA 360 gain from being updated. Hold signal 273 holds the gain constant when pulses are being read that are outside of the AGC field of pulses that are to be used to define the AGC gain. The externalfreeze 271 and internalfreeze 272 signals are for handling thermal asperity type problems. These three control signals are the inputs of NOR gate 230. If any of these three control signals is at a logic high level then the gainfrozen signal 285 output of NOR gate 230 goes low. With gainfrozen 285 low the agcupdate 284 output of AND gate 236 is low and the 0 input of multiplexer 228 is selected which defines a 0 change of the VGA 360 gain.

When none of the three gain update disable signals are asserted, any of three conditions cause an update of the AGC loop gain. The first condition is that a qualified peak is detected. When a qualified peak is detected qualifiedpeak signal 174 is asserted. The second condition is detection of analog to digital converter saturation which causes atodsat signal 289 to be asserted. The analog to digital converters can saturate when the VGA 360 gain is too high which causes the input to the analog to digital converters to be larger than the maximum convertable value. When an analog to digital converter is saturated the gain is reduced to take the analog to digital converter out of saturation, as a result when atodsat 289 is asserted the gainerror signal 277 is provided to the gainupdater signal 278 unless gainfrozen signal 285 is active. When all of the analog to digital converter bits are asserted the analog to digital converter is considered saturated. The absolutesample 172 signal is an output from the FIG. 1 digital qualified peak detector circuit and is an input to AND gate 220. The larger width of the absolutesample 172 signal line indicates that the signal line is comprised of a plurality of bit lines. In one embodiment the absolutesample signal line 172 is comprised of five bit lines. The five bit lines comprise the six output bits of the analog to digital converters 110 and 114 converted to an absolute value and saturated to five bits. When one of the analog to digital converters saturates, all of the five bit lines are asserted which causes the atodsat 289 output of AND gate 220 to be asserted. When an analog to digital converter is saturated, the servogainerror 175 is positive regardless of the programmed desired peak values. The positive servogainerror 175 reduces the VGA 360 gain. The third condition that can cause the VGA 360 gain to be updated is that a pulse is not detected for an extended period of time which causes the no peak timeout ("nopktimeout") signal 276 to be asserted as described below.

The absolutesample 172 signal is coupled to the inputs of AND gate 220. The output of AND gate 220 is coupled to one input of OR gate 222. Qualifiedpeak signal 174 is coupled to the other input of OR gate 222. The output of OR gate 222 is coupled to one input of OR gate 224. The other input of OR gate 224 is coupled to the nopktimeout 276 signal. Therefore if either the qualifiedpeak signal 174 or the atodsat signal 289 is high the output of OR gate 224 will be high. The output of OR gate 224 is then coupled to input I of multiplexer 234. In servo mode, input I of multiplexer 234 is selected, which couples the output of OR gate 224 to one input of AND gate 236. The output of AND gate 236 is the agcupdate 284 signal. Therefore, if any one of the three signals, atodsat 289, qualifiedpeak 174 or nopktimeout 276 are high then one input to AND gate 236 is high, and the gainfrozen signal 285 determines whether the gainupdater 278 signal is held at 0 or set to the gainerror 277 value. Similarly if all three of the signals, atodsat 289, qualifiedpeak 174 and nopktimeout 276 are low then agcupdate 284 is low and the VGA 360 gain is held constant.

Countdown Timer

The countdown timer 212 ensures that if no pulses are detected by the time a timeout period expires then the VGA 360 gain is increased. Where the VGA 360 gain is low, and pulses have an amplitude below the qualified peak threshold then qualifiedpeak signal 174 and atodsat signal 289 are both low and initially the VGA 360 gain is not updated. For example, if the desired VGA 360 output is 1 V and the qualified threshold is set at 500 mV, but full amplitude pulses are only 100 mV because the gain is so low, then none of these pulses exceed the qualified threshold so as to update the VGA 360 gain. Such a situation can be caused by thermal asperity, where with an MR head, when the head contacts the disk it can cause an increase in the DC baseline component of the AGC loop input signal. This can cause the AGC loop gain to be decreased to a low value. When this low gain is used at the next servo field it may cause all of the pulses to be below the qualified peak threshold, which would otherwise keep the AGC loop gain from being updated.

Countdown timer 212 prevents the system from locking-up in this condition. The countdown timer 212 in FIG. 2 is a nine bit down counter with 7 MSBs programmable to a programmable start count via assertion of the LOAD input. The timeout period for countdown timer 212 is programmed by servo timeout register 210. The output of OR gate 214 is coupled to the LOAD input of countdown timer 212. When the LOAD signal goes high the timeout value provided by servo timeout register 210 is loaded into the countdown timer 212 input bits, the counter is reset, and a new countdown is begun. Countdown timer 212 is reset to its programmed start count when any of the following five conditions occur: a qualified peak is detected, an analog to digital converter is saturated, the MSB of the start count register is asserted, gainfrozen 285 goes low, or servogate 274 goes high. When a qualified peak is detected or an analog to digital converter is saturated then the system is not in a state where the VGA gain is so low that the full amplitude pulses are below the qualified peak threshold. Therefore both of these conditions provide an asserted signal input to OR gate 214, and restart the countdown timer 212 count. When any of the three gain update disable signals 271–273 are asserted this causes the gainfrozen 285 signal to go low. The gainfrozen signal 285 is inverted by gate 232 to provide the gainfrozen signal 286 input to OR gate 214. Thus, when one of the three gain update disable signals 271–273 are asserted countdown timer 212 is reset.

The servrise signal 280 is another input to OR gate 214 which resets countdown timer 212. When the AGC loop switches to servo mode servogate 274 switches high which produces a pulse on servrise 280. The servogate signal 274 passes through double delay register 240 and is coupled to one input of AND gate 238. The output of double delay register 240 is also coupled through delay register 242 to the inverted input of AND gate 238. When servogate 274 switches high, the servrise 280 output of AND gate 238 switches high until the servogate 274 transition propagates through delay register 242 to the inverted AND gate 238 input.

In one embodiment, countdown timer 212 decrements its count every 25 ns while the current count is positive and the LOAD input is deasserted, until the count saturates at zero. A count of zero is decoded to produce the nopktimeout signal 276. The nopktimeout signal 276 is an input to OR gate 224. When nopktimeout 276 is high this causes the output of OR gate 224 to be high. The output of OR gate 224 is then coupled through multiplexer 234 to AND gate 236. Therefore when nopktimeout 276 goes high the VGA 360 gain is updated unless one of the three gain update disable signals 271–273 are active. The nine bit parallel output of countdown timer 212 is OR'd together. The output of the OR gate is coupled to the CNTENABLE input of the counter. If the count is non-zero the output of the OR gate is high which through the CNTENABLE input enables decrementing to the next successive count. When the count reaches zero, the OR gate output is low which disables further decrements of the counter. The counter remains at zero until the LOAD signal is asserted.

Timeout periods can be defined based on a variety of factors to optimize performance. The timeout value provided by servo timeout register 210 is controlled by a digital signal processing unit under program code control. Timeout values that are used for a disk drive can be a function of any disk drive performance parameter including the type of read head, the pulse detection circuitry, and the disk characteristics. In one embodiment, a timeout period is defined to be longer than the time to pass over a DC erased area. On a hard disk with a DC erased gap preceding the servo field, for the drive to correctly identify the location of the servo field, the servo pulse detector should not report any pulses during the DC erased area, and the servo pulse detector should respond with qualified pulses regularly during normal sector data fields. By setting the timeout period to longer than the time to pass over a DC erased area, the VGA 360 gain is not updated during the DC erased area. This avoids undesired gain increases due to the absence of pulses in the DC erased area. As a result, the VGA 360 gain is at an appropriate level to respond to pulses detected after the DC erased area. In one embodiment a DC erased gap of approximately 1 μs is used.

The timeout period can also be modified during operation of the disk drive. For example, when a disk begins to spin, the drive establishes servo lock to ensure accurate disk positioning. One step in establishing servo lock is to identify the location of the servo fields on the disk. During this process both servo pulses and read data are read. There can be extended periods of time where no data pulses are detected. To avoid excessive increases in the AGC loop gain the timeout period can be defined to be a relatively long period until servo lock is established. After servo lock is established, when the head enters a servo field the timeout period can be reduced to a value appropriate to the servo pattern. The timeout period may also be adjusted based on the radial distance of the head from the center of the disk, the characteristics of the read head output signals, or other factors to maximize drive performance.

The FIG. 2 gain update control circuit provides several signals to the FIG. 3 gain accumulator and control circuit. The gain error estimate signal gainupdater 278 is an input to gain accumulator 308 shown in FIG. 3. Servtime signal 279 is a multiplexer control signal that is provided to the circuit of FIG. 3. The servtime signal 279 is a control signal that indicates whether the AGC loop is in servo mode. The servrise signal 280, servfall signal 281, readrise signal 282, and readfall signal 283 are control signal inputs to the FIG. 3 gain accumulator and control circuit. When servogate 274 switches high this produces a pulse on servrise 279. When servogate 274 switches low this produces a pulse on servfall 281. Similarly, a rising edge on readgate 275 produces a readrise 282 pulse, and a falling edge on readgate 275 produces a readfall 283 pulse.

Gain Accumulator and Control Circuit

FIG. 3 illustrates a block diagram of a gain update control circuit according to one embodiment of the present invention. The FIG. 3 circuit updates the gain of VGA 360. The FIG. 3 circuit includes a gain accumulator block 308 comprising multiplier 350 which is coupled to adder 352, followed by multiplexer 354 and delay 356. The output of gain accumulator 308 is coupled to digital to analog converter 358 which controls the gain of VGA 360. The FIG. 3 circuit includes a servo gain control component and a data gain control component. The servo gain control components include servogain shadow register 312 and servogain program register 316. The data gain control components include readgain shadow register 330 and readgain program register 334.

In operation, the gainupdater 278 signal is an output signal from FIG. 2 which indicates the difference between the actual pulse amplitude and the desired pulse amplitude. The larger width signal lines, including for example gainupdater 278 and servgamma 381, indicate that the signal line is comprised of a plurality of bit lines. The even wider signal lines such as gcaccum 387 indicate that they are comprised of a larger number of bit lines, for example in one embodiment gcaccum 387 comprises 16 bit lines. Gainupdater 278 is one input into multiplier 350. The other input into multiplier 350 is provided by the output of multiplexer 348, which is controlled by servtime signal 279. The gain error estimate, gainupdater 278, is multiplied by one of three programmable step sizes, servgamma 381, trkgamma 382 or acqgamma 383. Servtime signal 279 is another FIG. 2 output control signal. Servtime 279 is deasserted when the AGC loop is in data mode. When servtime 279 is deasserted, the step size is dependent on the data channel's sequencer, which provides the datatrack control signal 384 to indicate that initial gain acquisition is complete. The data channel's sequencer also selects between the programmable acquisition step size, acqgamma 383, and tracking step size, trkgamma 382. Servtime 279 is asserted when the AGC loop is in servo mode. In servo mode, servtime 279 couples the servgamma signal 381 input of multiplier 348 to a second input of multiplier 350. Servgamma 381 is a multiplier factor of gainupdater 278. The product of servgamma 381 and gainupdater 278 defines the change in the loop gain. That product is added to the loop gain from the previous clock cycle by adder 352. When the control line of multiplexer 354 is low, the sum output of adder 352 is used to update the gain accumulator value held in register 356. The MSB's of register 356 are coupled to digital to analog converter 358. Digital to analog converter 358 converts the 8 bit digital signal to an analog voltage to set the gain of VGA 360. VGA 360 then amplifies the pulses read from the disk to optimize detection.

When the AGC loop switches between read mode and servo mode it is desirable to provide VGA 360 with an initial gain value that is an estimate of the gain that will optimize the signal amplitude. This allows for rapid switching between servo mode and data mode. One way this is done is to provide the gain value that was used at the end of the previous read mode or servo mode. At the end of a servo mode the gain value is stored in servogain shadow register 312. This value can then be retrieved at the start of the next servo period. The circuit of FIG. 3 performs this function as follows, at the end of a servo mode period, a pulse is generated on the servfall 370 signal. This pulse selects the gcontrol 385 input of multiplexer 312. The eight MSB's of the gcaccum signal 387 become the gcontrol signal 385. Gcontrol 385 is a digital binary number representing the gain of VGA 360. Multiplexer 310 couples this gain value into servogain shadow register 312 where it is stored.

At the start of the next servo mode, an initial gain value may be provided by either servogain shadow register 312 or servogain program register 316. A Digital Signal Processor ("DSP") controller or microprocessor can load an initial gain value into servogain program register 316 using the control lines sgnuval 371 and sgninit 372. At the start of a new servo mode period, servtime 279 and servrise 280 are asserted. Whenever servogain program register 316 is written, the sgnuval signal 371 causes the selection of the value stored in the register as the next value of the multiplexer 314 output, the servginit 376 signal. The select line remains active until the next assertion of the servrise signal 280. When servrise 280 is next asserted, if the sgninit signal 280 is asserted then the initial gain value for the succeeding sector is supplied by servogain program register 316. If, at this time, the sgninit signal 280 is deasserted then the initial gain value for the succeeding sector is supplied by the servo gain shadow register 312. For example, when sgnuval 371, sgninit 372 and the output of inverter 320 is low, the output of AND gate 322 is low and the output of OR gate 324 is low. Therefore the servogain shadow register 312 input to multiplexer 314 is selected. The servtime signal 279 is coupled to the control line of multiplexer 318. The pulse on servtime 279 at the start of a servo mode couples the initial servo value from multiplexer 314 to multiplexer 354. The logic high level signal on servrise 280 couples the initial gain value through multiplexer 354 to register 356 and digital to analog converter 358. Digital to analog converter 358 then converts the digital gain value to an analog voltage level to set VGA 360 to the initial servo gain level.

For read mode, the gain value from the previous read mode is stored in readgain shadow register 330. An initial gain value is programmed into readgain program register 334. The operation of read gain control signals readfall 283, rgnuval 379, and rgninit 380 parallels the operation of servo mode gain control signals servfall 370, sgnuval 371, sgninit 372 and servrise 280.

The control logic for the read gain and servo gain allows gain accumulator block 308, digital to analog converter 358 and VGA 360 to be time shared for read functions and servo functions. Storing the gain values in servogain shadow register 312 and readgain shadow register 330 facilitates rapid switching between the two functions. Using the same gain components for read and servo functions reduces the size and cost of the device.

Other features and advantages of the present invention may become apparent to a person of skill in the art who studies this disclosure. As already mentioned, this invention is equally useful in detecting peaks of other signals besides disk drive signals. Other alternatives may also become apparent. Therefore, the scope of the present invention is to be limited only by the following claims.

What is claimed is:

1. A method of controlling the gain of a variable gain amplifier (VGA) comprising the steps of:
   (a) programming a countdown timer countdown value;
   (b) starting said countdown timer;
   (c) resetting said countdown timer, if a qualified peak is detected; and
   (d) updating the gain of the VGA, if the countdown timer completes a countdown.

2. The method of claim 1 further comprising steps of:
   (e) sampling an analog signal;
   (f) converting the amplitude of the analog samples into digital signals;
   (g) comparing the amplitude of the analog samples to a qualified threshold value;
   (h) substracting the amplitude of the analog samples from a desired amplitude; and
   (i) updating the VGA based on the difference between the actual and the desired sample amplitudes when a sample that exceeds the qualified threshold value is detected.

3. The method of claim 2 wherein said VGA is in a disk drive digital peak detector system.

4. The method of claim 3 further comprising the step of storing the value of the gain of the variable gain amplifier when a servo mode ends.

5. The method of claim 3 further comprising the step of programming a register to provide an initial gain value to the variable gain amplifier.

6. The method of claim 3 further comprising the step of reducing the countdown value after obtaining servo lock.

7. The method of claim 3 further comprising the step of changing the countdown value as a function of the radial distance of a read head from the center of the recording medium.

8. The method of claim 3 further comprising the step of resetting said countdown timer when an analog to digital converter saturates.

* * * * *